(12) United States Patent
Lv et al.

(10) Patent No.: US 10,526,833 B2
(45) Date of Patent: Jan. 7, 2020

(54) CONTROL APPARATUS AND CONTROL METHOD FOR SUNROOF OF VEHICLE, AND VEHICLE

(71) Applicant: BOE TECHNOLOGY GROUP CO., LTD., Beijing (CN)

(72) Inventors: Xuewen Lv, Beijing (CN); Xiying Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 99 days.

(21) Appl. No.: 15/708,631

(22) Filed: Sep. 19, 2017

(65) Prior Publication Data

US 2018/0209202 A1 Jul. 26, 2018

(30) Foreign Application Priority Data

Jan. 25, 2017 (CN) .......................... 2017 1 0060880

(51) Int. Cl.
*E05F 15/70* (2015.01)
*B60J 7/043* (2006.01)
*E05F 15/71* (2015.01)

(52) U.S. Cl.
CPC .............. *E05F 15/70* (2015.01); *B60J 7/043* (2013.01); *E05F 15/71* (2015.01); *E05Y 2900/542* (2013.01)

(58) Field of Classification Search
None
See application file for complete search history.

(56) References Cited

U.S. PATENT DOCUMENTS

| 2006/0006701 | A1* | 1/2006 | Wells | B60J 7/0573 296/223 |
| 2014/0288784 | A1* | 9/2014 | Van Wiemeersch | E05F 15/77 701/46 |
| 2015/0184442 | A1* | 7/2015 | Gantman | E05F 17/00 701/49 |
| 2015/0325096 | A1* | 11/2015 | Hatch | F24F 11/30 340/601 |

(Continued)

FOREIGN PATENT DOCUMENTS

| CN | 102991317 A | 3/2013 |
| CN | 104191945 A | 12/2014 |

(Continued)

OTHER PUBLICATIONS

First Office Action for Chinese Application No. 201710060880.5, dated Oct. 29, 2018, 6 Pages.

*Primary Examiner* — Rami Khatib
(74) *Attorney, Agent, or Firm* — Brooks Kushman P.C.

(57) ABSTRACT

The present disclosure provides a control apparatus and a control method for a sunroof of a vehicle, and the vehicle including the control apparatus. The control apparatus includes an acquisition device, a sensor and a control device. The acquisition device is configured to acquire a precipitation probability value at a place where the vehicle is located, the sensor is configured to measure a humidity value outside the sunroof, and the control device is configured to compare the precipitation probability value and the humidity value with a preset precipitation probability threshold and a preset humidity threshold respectively, so as to control the sunroof.

9 Claims, 5 Drawing Sheets

(56) References Cited

U.S. PATENT DOCUMENTS

| | | | |
|---|---|---|---|
| 2016/0014983 A1* | 1/2016 | Micu | G05B 15/02 |
| | | | 700/284 |
| 2016/0069119 A1* | 3/2016 | Hudepohl | E05F 1/002 |
| | | | 49/31 |
| 2016/0333627 A1* | 11/2016 | Dudar | E05F 15/71 |
| 2017/0016266 A1* | 1/2017 | Van Wiemeersch | E05F 15/71 |
| 2017/0211309 A1* | 7/2017 | Beauvais | E05F 15/71 |
| 2018/0001734 A1* | 1/2018 | Faust | B60H 1/00064 |

FOREIGN PATENT DOCUMENTS

| | | |
|---|---|---|
| CN | 104453535 A | 3/2015 |
| CN | 104746997 A | 7/2015 |
| CN | 103253214 B | 9/2015 |
| CN | 205100742 U | 3/2016 |
| CN | 205189604 U | 4/2016 |
| DE | 102015008599 A1 | 1/2017 |
| KR | 20050023740 A | 3/2005 |
| KR | 20050090600 A | 9/2005 |

* cited by examiner

CONTROL APPARATUS AND CONTROL METHOD FOR SUNROOF OF VEHICLE, AND VEHICLE

CROSS-REFERENCE TO RELATED APPLICATION

This application claims priority to Chinese Patent Application No. 201710060880.5 filed on Jan. 25, 2017, which is incorporated herein by reference in its entirety.

TECHNICAL FIELD

The present disclosure relates to a control apparatus and a control method for a sunroof of a vehicle, and the vehicle.

BACKGROUND

A sunroof is mounted on a top of a vehicle, and it may be of an outwardly-sliding type, a built-in type, a built-in-and-flip-over type, a panoramic type and a curtain type.

Health of a driver or passenger may be adversely affected by possible air pollution inside the vehicle. Especially, after the usage of the vehicle for a certain time period in a closed state, a carriage of the vehicle may be inundated with such hazardous substances as benzene and formaldehyde from decorative items. Hence, after night, it is necessary to open the sunroof when the driver or passenger gets on the vehicle. On the basis of a negative-pressure ventilation principle, it is able to filter out the air inside the vehicle, thereby to ensure the health of the driver or passenger. Through the sunroof, it is able to effectively achieve the air flow inside the vehicle and provide fresh air, thereby to ensure the health of the driver or passenger and improve a comfort level.

In addition, it is able to provide a wide viewing field through the sunroof, enable the driver or passenger to be close to nature and soak up the sun, increase the brightness inside the vehicle, and prevent the occurrence of depression for the driver or passenger. Further, usually the sunroof may be opened for photography and video recording.

Due to the above-mentioned advantages, the sunroof of the vehicle is usually opened when the vehicle is in a running or parking state. However, when the vehicle is parked in an open area, many accidents, such as raining and snowing, may occur. At this time, damages may occur due to the rain or snow entering the vehicle through the sunroof.

SUMMARY

An object of the present disclosure is to provide a control apparatus and a control method for a sunroof of a vehicle, and the vehicle.

In one aspect, the present disclosure provides in some embodiments a control apparatus for a sunroof of a vehicle, including: an acquisition device configured to acquire a precipitation probability value at a place where the vehicle is located; a sensor configured to measure a humidity value outside the sunroof; and a control device configured to compare the precipitation probability value and the humidity value with a preset precipitation probability threshold and a preset humidity threshold respectively, so as to control the sunroof.

In a possible embodiment of the present disclosure, the control apparatus further includes a position detection device configured to detect whether or not the sunroof is in an open position.

In a possible embodiment of the present disclosure, the control apparatus further includes a driving device configured to drive the sunroof in accordance with a control signal from the control device, so as to open or close the sunroof.

In a possible embodiment of the present disclosure, the acquisition device is configured to acquire the precipitation probability value via a network.

In a possible embodiment of the present disclosure, the acquisition device further includes a communication unit configured to access to the network to acquire data.

In a possible embodiment of the present disclosure, the acquisition device is further configured to acquire the precipitation probability value in accordance with an acquisition period, and the control device is further configured to adjust the acquisition period in accordance with the acquired precipitation probability value and/or the acquired humidity value.

In a possible embodiment of the present disclosure, the precipitation probability threshold includes a first threshold, and the control device is further configured to, when the precipitation probability value is smaller than the first threshold, prolong the acquisition period, and when the precipitation probability value is greater than the first threshold, shorten the acquisition period.

In a possible embodiment of the present disclosure, the precipitation probability threshold further includes a second threshold greater than the first threshold, and the control device is further configured to, when the precipitation probability value is greater than the second threshold, enable the sensor to detect the humidity value outside the sunroof.

In a possible embodiment of the present disclosure, the humidity threshold includes a third threshold, and the control device is further configured to, when the humidity value is greater than the third threshold, close the sunroof.

In a possible embodiment of the present disclosure, the control apparatus further includes a positioning device configured to determine a position where the vehicle is currently located.

In a possible embodiment of the present disclosure, the sensor includes a humidity sensitive element.

In a possible embodiment of the present disclosure, the control apparatus further includes an input device configured to enable a user, on its own initiative, to set the precipitation probability threshold and the acquisition period, and prolong or shorten the acquisition period.

In a possible embodiment of the present disclosure, the control apparatus further includes an electricity quantity detection device configured to detect electricity quantity of a battery of the vehicle, and the control device is further configured to, when the electricity quantity is smaller than an electricity quantity threshold, close the sunroof.

In a possible embodiment of the present disclosure, the control apparatus further includes a positioning device configured to determine a position where the vehicle is currently located.

In another aspect, the present disclosure provides in some embodiments a vehicle including the above-mentioned control apparatus.

In yet another aspect, the present disclosure provides in some embodiments a smart control method for a sunroof of a vehicle, including: acquiring a precipitation probability value at a place where the vehicle is located; measuring a humidity value outside the sunroof; and comparing the precipitation probability value and the humidity value with a preset precipitation probability threshold and a preset humidity threshold respectively, so as to control the sunroof.

In a possible embodiment of the present disclosure, the control method further includes: detecting whether or not the sunroof is in an open state, and when the sunroof is in the open state, acquiring the precipitation probability value and the humidity value.

In a possible embodiment of the present disclosure, the control method further includes adjusting an acquisition period for acquiring the precipitation probability value in accordance with the acquired precipitation probability value and the acquired humidity value.

In a possible embodiment of the present disclosure, the adjusting the acquisition period includes: when the precipitation probability value is smaller than a first threshold, prolonging the acquisition period; when the precipitation probability value is greater than the first threshold, shortening the acquisition period; when the precipitation probability value is greater than a second threshold, detecting the humidity threshold outside the sunroof, the second threshold being greater than the first threshold; and when the humidity value is greater than a third threshold, closing the sunroof.

In a possible embodiment of the present disclosure, the control method further includes detecting electricity quantity of a battery of the vehicle, and when the electricity quantity is smaller than an electricity quantity threshold, closing the sunroof.

According to the control apparatus and the control method for the sunroof of the vehicle and the vehicle in the embodiments of the present disclosure, the control apparatus includes the acquisition device, the sensor and the control device. The acquisition device is configured to acquire the precipitation probability value at a place where the vehicle is located, the sensor is configured to detect the humidity value outside the sunroof, and the control device is configured to compare the precipitation probability value and the humidity value with the preset precipitation probability threshold and the preset humidity threshold respectively, so as to control the sunroof.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

A rainfall sensor may be arranged outside a sunroof of a vehicle (e.g., an automobile or an electromobile). In a rainy or snowy day, when an amount of rain or snow detected by the rainfall sensor reaches a certain threshold, a control apparatus may send an instruction for automatically closing the sunroof. In addition, the control apparatus for some automobiles may also be provided with an oxygen concentration sensor and an automatic alarm.

However, the sunroof is closed only if the amount of rain or snow measured by the rainfall sensor reaches the threshold, so a certain amount of rain or snow has entered the vehicle before the sunroof is closed. At this time, items in the vehicle might have been wetted, and probably damages have occurred or the vehicle needs to be cleaned. In other words, the sunroof is not closed automatically in time.

First Embodiment

Figure 1:
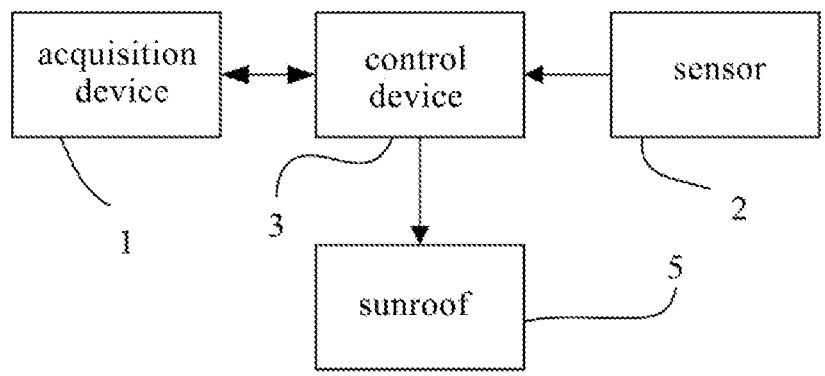
FIG. 1 is a schematic view showing a control apparatus for a sunroof of a vehicle according to one embodiment of the present disclosure.

The present disclosure provides in some embodiments a control apparatus for a sunroof of a vehicle. As shown in FIG. 1, the control apparatus may include an acquisition device 1, a sensor 2 and a control device 3. In the first embodiment, the acquisition device 1 is configured to acquire a precipitation probability value at a place where the vehicle is located, i.e., the rain or snow probability at the place. The sensor 2 is configured measure a humidity value outside the sunroof, and the control device 3 is configured to compare the precipitation probability value and the humidity value with a preset precipitation probability threshold and a preset humidity threshold respectively, so as to control (e.g., close or open) the sunroof 5.

For example, the acquisition device 1 and the control device 3 may be arranged in the vehicle with the sunroof 5, and the sensor 5 may be arranged outside the sunroof 5 to measure the humidity value outside the sunroof. When the precipitation probability value acquired by the acquisition device 1 reaches the preset precipitation probability threshold (i.e., 60%) and the humidity value outside the sunroof 5 measured by the sensor 2 also reaches the preset humidity threshold (e.g., 70%), the control apparatus 3 may close the sunroof 5 automatically before the precipitation, thereby to prevent the occurrence of damages. In addition, for example, when each of the precipitation probability value and the humidity value fails to reach the precipitation probability threshold or the humidity threshold, the sunroof may be kept in an open state.

For example, in the first embodiment, the acquisition device 1 may be configured to acquire the precipitation probability value via a network which may be Internet or a local area network in the vehicle. The acquisition device 1 may access to the network in a wired or wireless manner. The wireless network includes Wireless Fidelity (WiFi), Bluetooth, and a wireless communication network (e.g., $3^{rd}$-Generation (3G), $4^{th}$-Generation (4G) or a $5^{th}$-Generation (5G) wireless communication network). The precipitation probability value may be acquired, e.g., from a service provider who provides a weather forecast service, or from an application (APP) which runs on an on-board computer or a smart phone and which acquires corresponding data from the service provider providing the weather forecast service. The acquisition device 1 may be an individual device, or serve as a part of a mobile terminal such as the on-board computer or the smart phone. In the first embodiment, an implementation mode of the acquisition device will not be particularly defined, and it should be appreciated that, the acquisition device 1 may be selected from software, firmware or hardware having a function of acquiring the precipitation probability value, or a combination thereof. For example, currently a mobile phone may have a weather acquisition function, and the control apparatus in this embodiment may be implemented using a similar technique. For example, the acquisition device may be configured to directly receive data in a certain format from the service provider and read the precipitation probability value from a dedicated field in the data, or identify sensitive words in a message about the weather forecast, e.g., "the precipitation probability value is . . . percent".

In this embodiment, the acquisition device 1 may further include a communication unit which is capable of accessing to the network to acquire the data. For example, the communication unit may be connected to, or include, a Bluetooth device, a wireless communication device or a WiFi device.

In a possible embodiment of the present disclosure, the acquisition device 1 may be further configured to acquire the precipitation probability value in accordance with a certain acquisition period, and the acquisition period may be adjusted through the control device, e.g., the weather acquisition period may be prolonged or shortened in accordance with the practical need. The acquisition period is an interval between a current acquisition operation and a next acquisition operation. The control device 3 may be further configured to adjust the acquisition period in accordance with the acquired precipitation probability value and the acquired humidity value. For example, when the precipitation probability value is small relative to the preset precipitation probability threshold, the acquisition period may be prolonged appropriately or a relatively long acquisition period may be kept. When the precipitation probability value is large relative to the preset precipitation probability threshold, the acquisition period may be shortened appropriately or a relatively short acquisition period may be kept. The acquisition device 1 may be implemented by, e.g., software, firmware, hardware, or a combination thereof.

Figure 2:
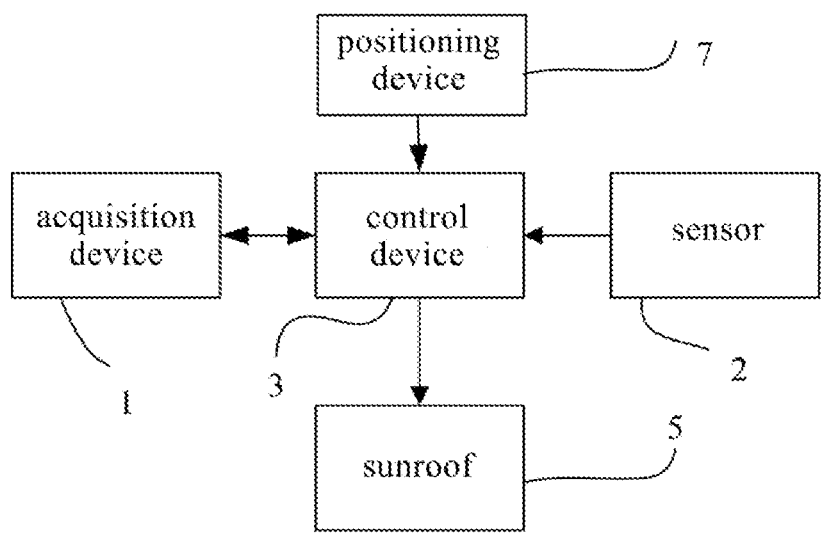
FIG. 2 is another schematic view showing the control apparatus according to one embodiment of the present disclosure.

As shown in FIG. 2, the control apparatus may further include a positioning device 7 which is configured to determine a position where the vehicle is currently located. The position device 7 may be a Global Position System (GPS) device or a Beidou positioning device. In a possible embodiment of the present disclosure, the positioning device 7 may also access to the mobile terminal such as the on-board computer or the smart phone, so as to use a positioning device therein to acquire the position where the vehicle is currently located. The acquisition device 1 may use information about the determined position to acquire the precipitation probability value at the place.

The sensor 2 may include a humidity sensor, e.g., a humidity sensitive element. The humidity sensitive element may be of a resistive type and a capacitive type. The resistive-type humidity sensitive element includes a humidity sensitive film made of a humidity sensitive material and arranged on a substrate. When water vapor in the air is adsorbed onto the humidity sensitive film, a resistivity and a resistance of the element may change. On this basis of this characteristic, the resistive-type humidity sensitive element may be used to measure the humidity value. The capacitive-type humidity sensitive element may be a polymer film capacitor, which may be made of polystyrene (PS), polyimide (PI), or cellulose acetate butyrate (CAB). When an ambient humidity value changes, a dielectric constant and thereby a capacitance of the capacitive-type humidity sensitive element may change too. The capacitance change is in direct proportion to the relative humidity. On the basis of this characteristic, capacitive-type humidity sensitive element may be used to measure the humidity value. The sensor 2 may be configured to convert a resultant humidity signal into a digital signal, and transmit the digital signal to the control device 3.

The control device 3 may be implemented by software, hardware, firmware or a combination thereof, e.g., a Programmable Logic Controller (PLC) or a Central Processing Unit (CPU). The control device 3 may include a processor and a memory in which an application is stored. The application may be executed by the processor, so as to acquire the precipitation probability value from the acquisition device, set the acquisition period for the acquisition device, acquire the humidity value from the sensor, and acquire the position where the vehicle is currently located.

According to the control apparatus in the first embodiment of the present disclosure, it is able to automatically close the sunroof before the precipitation, thereby to prevent the occurrence of damages.

Second Embodiment

Figure 3:
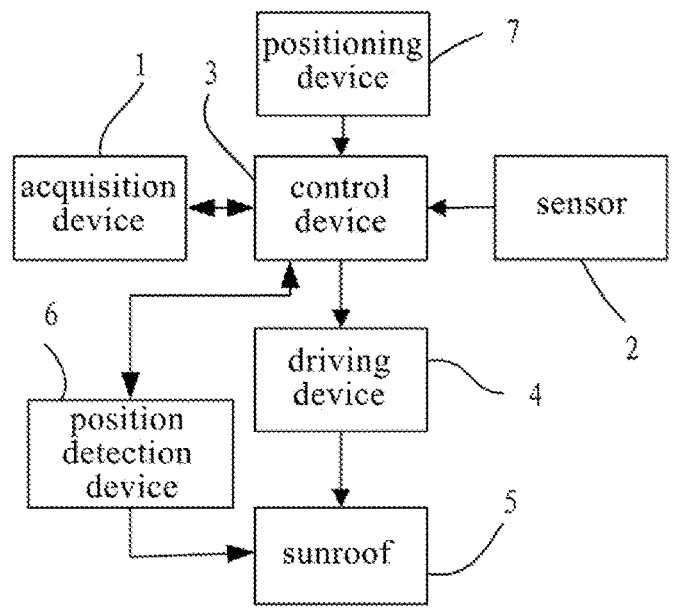
FIG. 3 is yet another schematic view showing the control apparatus according to one embodiment of the present disclosure.

The prevent disclosure provides in this embodiment another control apparatus for the sunroof of the vehicle which, as shown in FIG. 3, further includes a position detection device 6 and a driving device 4, on the basis of the control apparatus in FIG. 2.

In this embodiment, the position detection device 6 may be configured to detect whether or not the sunroof 5 is in an open position. When the sunroof 5 is not in the open position (i.e., in a closed position), the position detection device 6 may send a corresponding signal to the control device 3, so as to stop the control apparatus and save the power. When the sunroof 5 is in the open position, the position detection device 6 may send a corresponding signal to the control device 3, so as to enable the control apparatus to be in an on state. The position detection apparatus 6 may include, e.g., a contact sensor, a proximity sensor or a delimiting switch, through which it is able determine whether or not the sunroof 5 is closed.

In this embodiment, the driving device 4 may be configured to drive the sunroof 5 in accordance with a control signal from the control device 3, so as to open or close the sunroof. When the control device 3 determines that the precipitation probability value and the humidity value at the place are greater than the preset precipitation probability threshold and the preset humidity threshold respectively, it may send a signal to the driving device 4, so as to control the driving device 4 to close the sunroof 5.

Usually, the driving device 4 may be a sliding-plate driving mechanism or a sliding-block driving mechanism, and it may include an electric motor.

Third Embodiment

The present disclosure provides in this embodiment another control apparatus. As compared with the control apparatus in the above-mentioned embodiments, the acquisition device 1 in this embodiment is further configured to adjust the acquisition period in accordance with at least one preset precipitation threshold and at least one humidity threshold.

In this embodiment, the precipitation probability threshold may include a first threshold and a second threshold greater than the first threshold, and the humidity threshold may include a third threshold.

For example, the precipitation probability threshold may include the first threshold, the control device 3 may be further configured to: when the precipitation probability value is smaller than the first threshold, prolong the acquisition period appropriately, or keep a relatively long acquisition period; and when the precipitation probability value is greater than the first threshold, shorten the acquisition period appropriately or keep a relatively short acquisition period. For example, when the first threshold is 40% and the acquired rainfall or snowfall probability is 30% at that day, the acquisition period may be set as performing the acquisition every 12 hours. When the acquired rainfall or snowfall probability is 45%, the acquisition period may be set as performing the acquisition every 8 hours. In this way, it is able to reduce the power consumption due to frequent acquisition operations.

For example, the precipitation probability threshold may include the second threshold, the control device 3 may be further configured to, when the precipitation probability value is greater than the second threshold, control the humidity sensor to detect the humidity value outside sunroof, and control the processing unit to shorten the acquisition period appropriately or keep a relatively short acquisition period. Correspondingly, when the acquired rainfall or snowfall probability is greater than the first threshold and smaller than the second threshold, the acquisition period may be shortened. For example, when the first threshold is 40%, the second threshold is 60% and the acquired rainfall or snowfall probability at that place is 50%, the acquisition period may be shortened to performing the acquisition every four hours. In addition, the control device 3 may be further configured to control the sensor to detect the humidity value outside the sunroof.

For example, the humidity threshold may include the third threshold, and the control device 3 may be further configured to, when the humidity value measured by the sensor is greater than the third threshold, turn on the driving device 4 so as to close the sunroof 5. Correspondingly, when the rainfall or snowfall probability acquired by the acquisition device reaches the second threshold and the measured humidity value is smaller than the third threshold, the control device 3 may continue to shorten the acquisition period for the acquisition device. For example, when the acquired rainfall or snowfall probability is 70% which is greater than the second threshold 60%, the humidity sensor may be started so as to measure the humidity value. When the third threshold is 75% and the measured humidity value is greater than 75%, i.e., the precipitation probability is relatively large, the control device 3 may start the driving device 4, so as to close the sunroof 5. When the measured humidity value is smaller than 75%, the acquisition period may be shortened to performing the acquisition every two hours, and at this time, the sunroof 5 may be still kept in the open state. In this way, it is able to reduce the power consumption due to the frequent acquisition operations, and close the sunroof 5 in time if necessary.

In this embodiment, the acquisition device 1 is configured to adjust the acquisition period, in accordance with, but not limited to, the at least one preset precipitation probability threshold and the at least one preset humidity threshold. For example, a plurality of precipitation probability thresholds or a plurality of humidity thresholds may be provided, or the precipitation probability value and the humidity value may be detected simultaneously, or two humidity thresholds may be provided for the corresponding detection and the acquisition period may be shortened along with an increase in the humidity value detected by the sensor. In actual application, any other power-saving mode may be used.

Fourth Embodiment

The present disclosure provides in this embodiment another control apparatus. On the basis of the control apparatus in the above-mentioned embodiments, in this embodiment, the precipitation probability threshold, the acquisition period and the prolonging or shortening of the acquisition period may be set in a personalized manner. In addition, the control apparatus may further include an electricity quantity detection device, so as to dynamically adjust the acquisition time period in accordance with the electricity quantity consumption.

Figure 4:
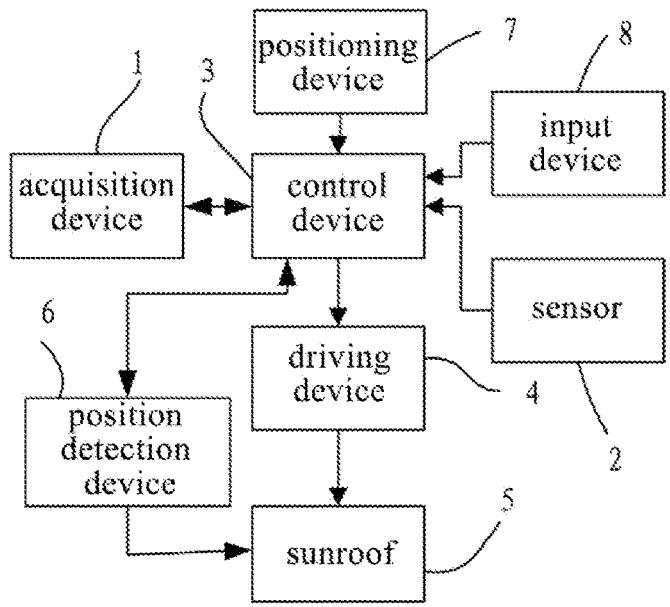
FIG. 4 is still yet another schematic view showing the control apparatus according to one embodiment of the present disclosure.

In this embodiment, the control device 3 may be further configured to enable a user, on its own initiative, to set the precipitation probability threshold and the acquisition period and prolong or shorten the acquisition period. In other words, apart from the mode where the control device 3 sets the precipitation probability threshold and the acquisition period and prolongs or shortens the acquisition period in accordance with the received data, the user may also set the precipitation probability threshold and the acquisition period and prolong or shorten the acquisition period in accordance with the practical need and local conditions, so as to improve the user experience. For example, as shown in FIG. 4, the control apparatus may further include an input device 8, and the user may set the above parameters through the input device. The input device may include a keyboard or a touch panel. The control device may be further configured to adjust the precipitation probability threshold and the acquisition period and prolong or shorten the acquisition period in accordance with the input from the input device.

Figure 5:
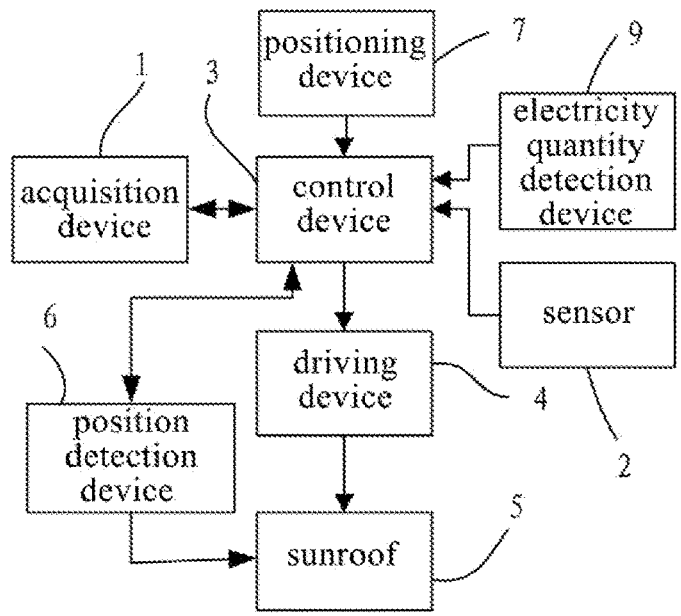
FIG. 5 is still yet another schematic view showing the control apparatus according to one embodiment of the present disclosure.

As shown in FIG. 5, the control apparatus may further include an electricity quantity detection device 9 configured to detect electricity quantity of a battery of the vehicle, and transmit the detected remaining electricity quantity to the control device 3. The electricity quantity detection device 9 may detect a fourth threshold which is a preset remaining electricity quantity of the battery of the vehicle, and the control device 3 may be further configured to, when the detected electricity quantity is smaller than the fourth threshold and a signal indicating that the sunroof is in the open state has been received from the position detection device 6, transmit a signal to the driving device 4, so as to close the sunroof 5. This is because, when the vehicle is parked for a long time period, the electricity of the accumulator may be used up, resulting in that the vehicle and the control apparatus cannot be started. Through the electricity quantity detection device 9, it is able to reduce the power consumption of battery due to the frequency acquisition operations performed by the acquisition device.

In addition, when the received remaining electricity quantity is smaller than the fourth threshold, the control device 3 may be further configured to prompt the user to charge the battery in time via the network or a display panel of the on-board computer, so as to prevent the occurrence of such problems that the vehicle cannot be started or the sunroof 5 cannot be closed. The fourth threshold may be set as a remaining electricity quantity value sufficient for closing the sunroof 5, sending a message to prompt the user and running on a standby mode for a certain time period (e.g., two hours), e.g., 10%.

Fifth Embodiment

The present disclosure provides in this embodiment a vehicle including the above-mentioned control apparatus. The vehicle may be a car, a sports car or an estate car. Usually, the sunroof is mounted on a top of the vehicle, and it may be of an outwardly-sliding type, a built-in type, a built-in-and-flip-over type, a panoramic type and a curtain type. Through the control apparatus, it is able to automatically close the sunroof of the vehicle before the precipitation, thereby to prevent the occurrence of damages.

The structure and the implementation of the control apparatus have been described hereinabove, and thus will not be particularly defined herein.

Sixth Embodiment

Figure 6:
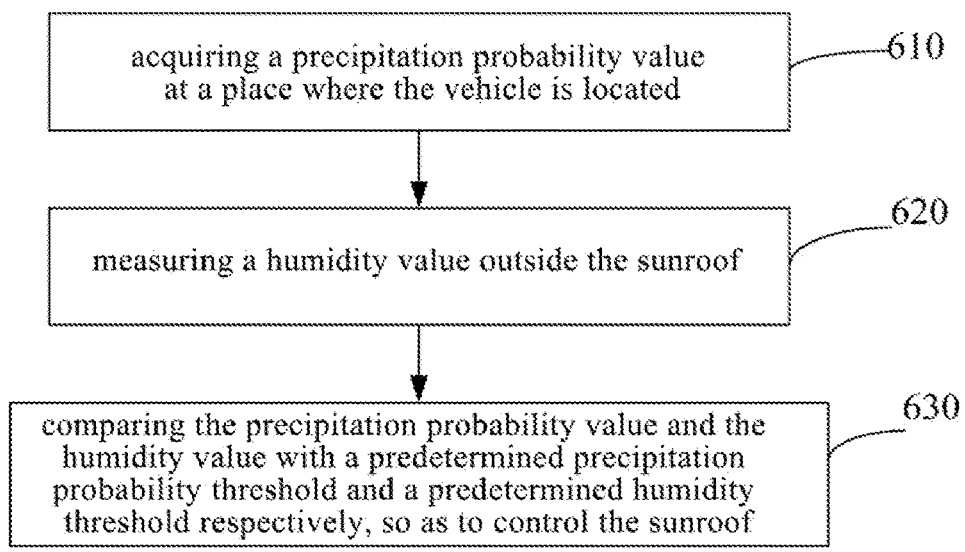
FIG. 6 is a flow chart of a control method for a sunroof of a vehicle according to one embodiment of the present disclosure.

The present disclosure further provides in this embodiment a control method for a sunroof of a vehicle which, as shown in FIG. 6, includes: Step 610 of acquiring a precipitation probability value at a place where the vehicle is located; Step 620 of measuring a humidity value outside the sunroof; and Step 630 of comparing the precipitation probability value and the humidity value with a preset precipitation probability threshold and a preset humidity threshold respectively, so as to control (close or open) the sunroof.

The control method in this embodiment may be implemented by the control apparatus as shown in any of FIGS. 1 to 5. The principle and the effect of the control method are similar to those of the control apparatus, and thus will not be particularly defined herein.

According to the control method in this embodiment, through acquiring the precipitation probability value at the place where the vehicle is located, measuring the humidity value outside the sunroof, and comparing the precipitation probability value and the humidity value with the preset precipitation probability threshold and the preset humidity threshold respectively, it is able to automatically close the sunroof before the precipitation, thereby to prevent the occurrence of damages.

Seventh Embodiment

The present disclosure further provides in this embodiment another control method for a sunroof of a vehicle. On the basis of the control method in FIG. 6, the control method in this embodiment may further include the following steps.

The control method may further include: detecting whether or not the sunroof is in the open state; when the sunroof is in the open state, acquiring the precipitation probability value and the humidity value at the place where the vehicle is located; and when the sunroof is in the closed state, stopping the control apparatus so as to save power.

In this embodiment, the acquisition period for acquiring the precipitation probability value may be adjusted in accordance with the acquired precipitation probability value and the acquired humidity value. To be specific, when the precipitation probability value is smaller than a first threshold, the acquisition period may be prolonged; and when the precipitation probability value is greater than the first threshold, the acquisition period may be shortened. In addition, when the precipitation probability value is greater than a second threshold greater than the first threshold, the humidity value outside the sunroof may be detected; and when the humidity value is greater than a third threshold, the sunroof may be closed.

In this embodiment, the control method may further include: detecting electricity quantity of a battery of the vehicle; and when the electricity quantity is smaller than a fourth threshold, closing the sunroof.

Figure 7:
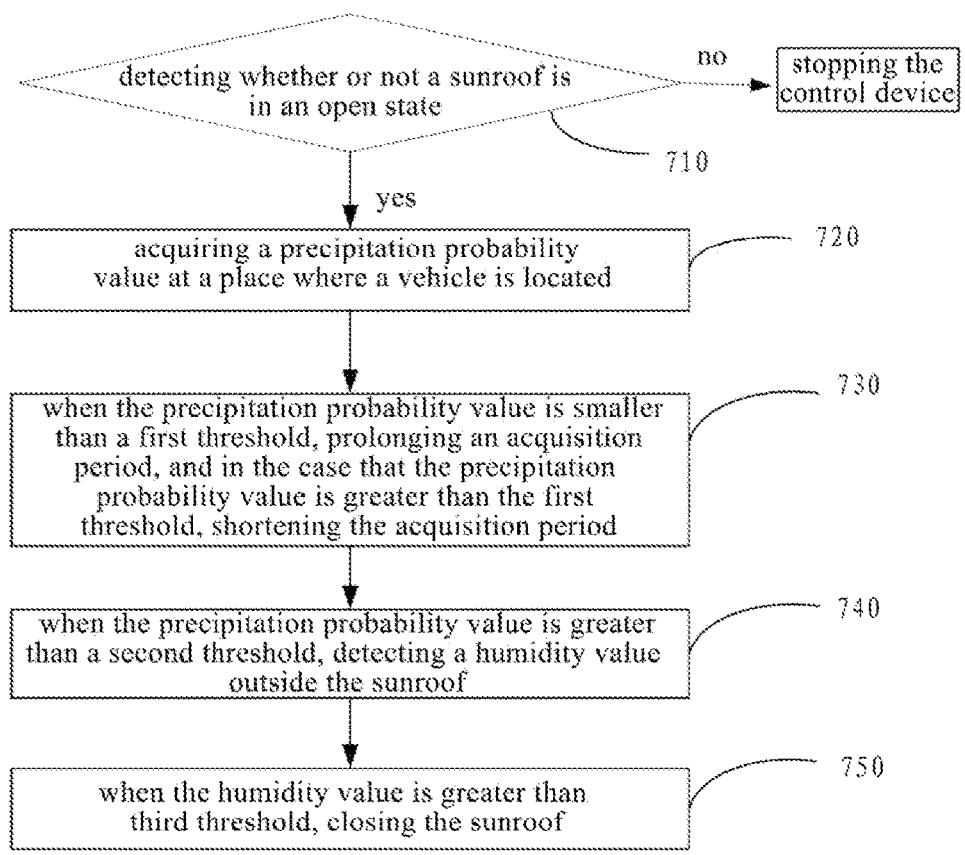
FIG. 7 is another flow chart of the control method according to one embodiment of the present disclosure.

As shown in FIG. 7, the control method for the sunroof of the vehicle may include: Step 710 of detecting whether or not the sunroof is in the open state, when the sunroof is in the open state, proceeding to step 720, and otherwise stopping the control apparatus; Step 720 of acquiring the precipitation probability value at the place where the vehicle is currently located; Step 730 of, when the precipitation probability value is smaller than the first threshold, prolonging the acquisition period, and when the precipitation probability value is greater than the first threshold, shortening the acquisition period; Step 740 of, when the precipitation probability value is greater than the second threshold which is greater than the first threshold, detecting the humidity value outside the sunroof; and Step 750 of, when the humidity value is greater than the third threshold, closing the sunroof.

The control method in this embodiment may be implemented by the control apparatus in the third embodiment. The principle and the effect thereof are similar to those mentioned in the third embodiment, and the above steps are identical to the corresponding operations of the control apparatus in the third embodiment, which thus will not be particularly defined herein.

Eighth Embodiment

Figure 8:
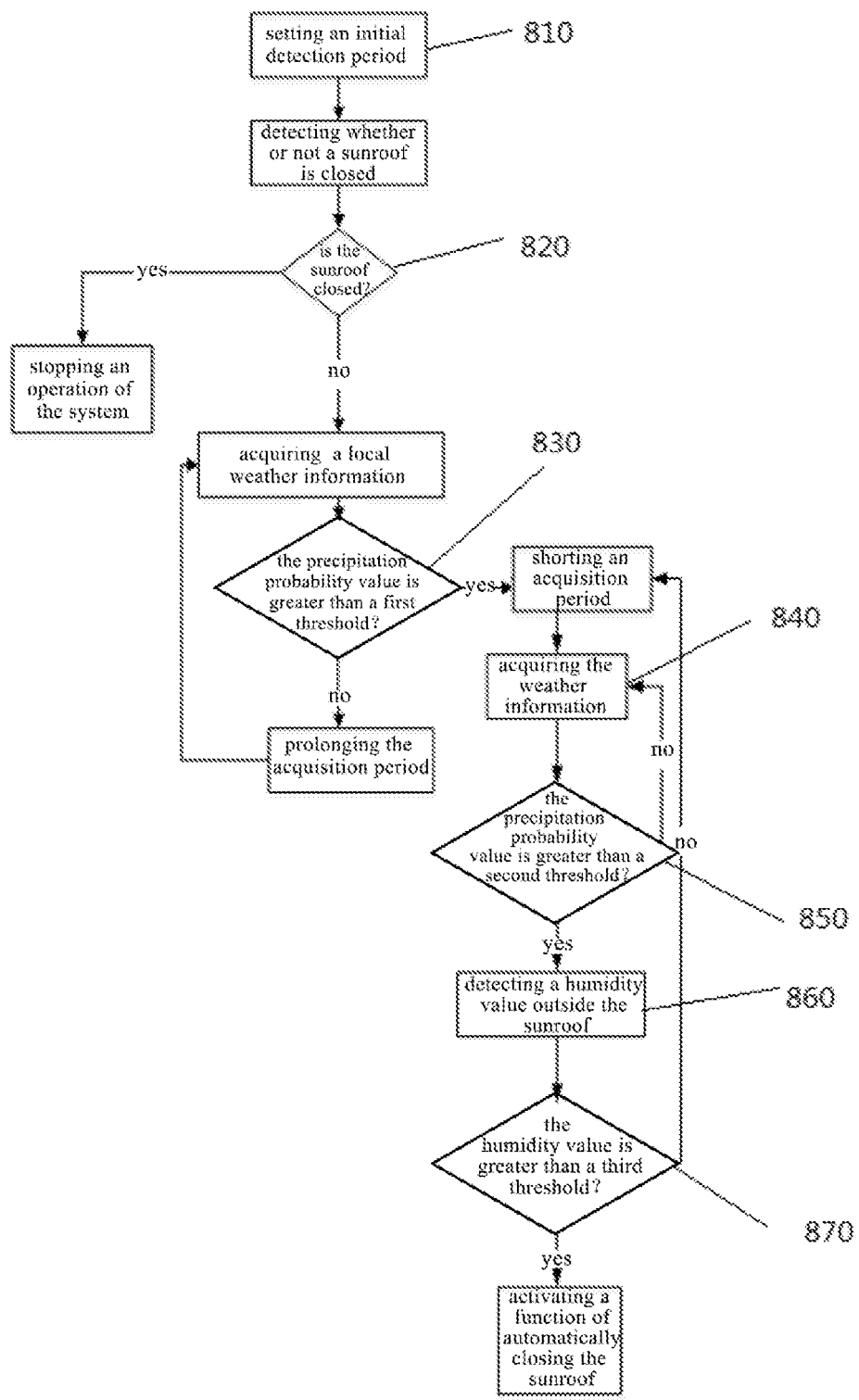
FIG. 8 is yet another flow chart of the control method according to one embodiment of the present disclosure.

The present disclosure provides in this embodiment another control method for a sunroof of a vehicle which, as shown in FIG. 8, may include: Step 810 of setting, by the control apparatus or the user an initial first threshold, an initial second threshold, an initial third threshold, and an acquisition period, and proceeding to Step 820; Step 820 of detecting whether or not the sunroof is in the open state, when the sunroof is in the open state, acquiring local weather information so as to acquire the precipitation probability value at the place where the vehicle is located, proceeding to Step 830, and otherwise, stopping the control apparatus; Step 830 of determining whether or not the acquired precipitation probability value at the place where the vehicle is currently located is greater than the first threshold, when the acquired precipitation probability is greater than the first threshold, shortening the acquisition period and proceeding to Step 840, and otherwise, prolonging the acquisition period and repeating Step 830; Step 840 of continuing to acquire the local weather information, so as to acquire the precipitation probability value at the place where the vehicle is current located, and proceeding to Step 850; Step 850 of determining whether or not the acquired precipitation probability value at the place where the vehicle is currently located is greater than the second threshold, when the acquired precipitation probability value is greater than the second threshold, detecting the humidity value outside the sunroof and proceeding to Step 860, and otherwise returning to Step 840; Step 860 of detecting the humidity value outside the sunroof, and proceeding to Step 870; and Step 870 of determining whether or not the humidity value outside the sunroof is greater than the third threshold, when the humidity value is greater than the third threshold, automatically closing the sunroof, and otherwise shortening the acquisition period and returning to Step 840.

The control method in this embodiment may be implemented by the control apparatus in the third embodiment. The principle and the effect thereof are similar to those mentioned in the third embodiment, and the above steps are identical to the corresponding operations of the control apparatus in the third embodiment, which thus will not be particularly defined herein.

It should be appreciated that, the present disclosure may be implemented by software, firmware as well as necessary common hardware, or by dedicated hardware, and in many cases the former may be preferred. Based on this understanding, the technical solutions of the present disclosure may appear in the form of software, hardware, firmware or any combination thereof, e.g., a computer software product which may be stored in a computer-readable storage medium, e.g., a magnetic storage medium (e.g., hard disk) or an electronic storage medium (e.g., Read-Only Memory (ROM) or flash disk) and which may include several instructions, so as to enable a computer apparatus (e.g., a computer, a server or a network apparatus) to execute the control apparatus and the control method in the embodiments of the present disclosure.

It should be further appreciated that, (1) the drawings in the embodiments merely relate to some necessary structures, and the other structures may refer to a conventional design. (2) In the case of no conflict, the embodiments of the present disclosure and the features therein may be combined with each other in any form, so as to acquire new embodiments.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A control apparatus for a sunroof of a vehicle, comprising:
   an acquisition device configured to acquire a precipitation probability value at a place where the vehicle is located;
   a sensor configured to measure a humidity value outside the sunroof; and
   a control device configured to compare the precipitation probability value and the humidity value with a preset precipitation probability threshold and a preset humidity threshold respectively, so as to control the sunroof;
   wherein the acquisition device is further configured to acquire the precipitation probability value in accordance with an acquisition period, and the control device is further configured to adjust the acquisition period in accordance with the acquired precipitation probability value and/or the acquired humidity value;
   wherein the precipitation probability threshold comprises a first threshold, and the control device is further configured to, when the precipitation probability value is smaller than the first threshold, prolong the acquisition period, and when the precipitation probability value is greater than the first threshold, shorten the acquisition period;
   wherein the precipitation probability threshold further comprises a second threshold greater than the first threshold, and the control device is further configured to, when the precipitation probability value is greater than the second threshold, enable the sensor to detect the humidity value outside the sunroof.

2. The control apparatus according to claim 1, further comprising a driving device configured to drive the sunroof in accordance with a control signal from the control device, so as to open or close the sunroof.

3. The control apparatus according to claim 1, wherein the acquisition device is configured to acquire the precipitation probability value via a network.

4. The control apparatus according to claim 3, wherein the acquisition device further comprises a communication unit configured to access to the network to acquire data.

5. The control apparatus according to claim 1, wherein the humidity threshold comprises a third threshold, and the control device is further configured to, when the humidity value is greater than the third threshold, close the sunroof.

6. The control apparatus according to claim 1, further comprising a positioning device configured to determine a position where the vehicle is currently located.

7. The control apparatus according to claim 1, wherein the sensor is a humidity sensitive element.

8. The control apparatus according to claim 6, further comprising an input device.

9. A vehicle comprising the control apparatus according to claim 1.

* * * * *